April 30, 1957 A. W. SIFF ET AL 2,790,944
SHIELDED MEASURING APPARATUS
Filed Sept. 11, 1953
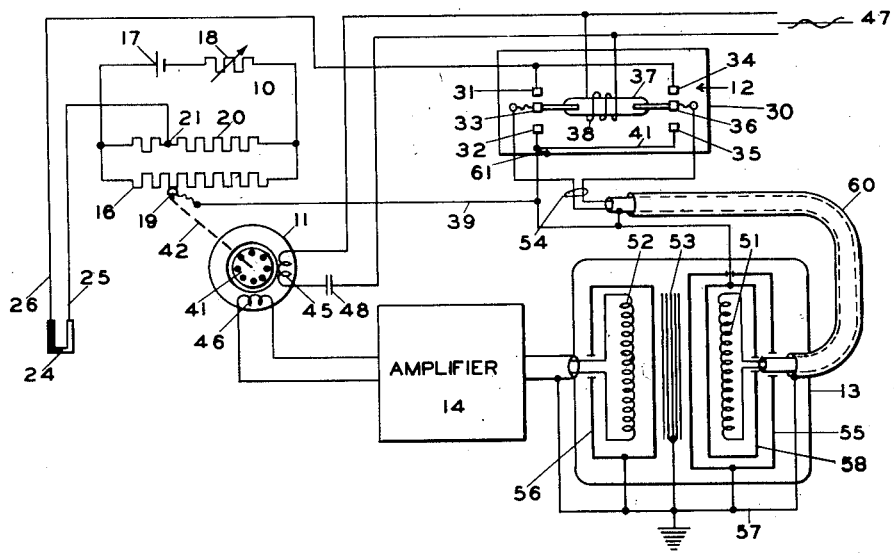

United States Patent Office 2,790,944
Patented Apr. 30, 1957

2,790,944

SHIELDED MEASURING APPARATUS

Abraham W. Siff, Stamford, and Kenneth R. Neale, Watertown, Conn., assignors to The Bristol Company, Waterbury, Conn., a corporation of Connecticut Application September 11, 1953, Serial No. 379,532

8 Claims. (Cl. 318—28)

This invention relates to servo-actuated instruments for the detection and measurement of small electrical potentials such as those derived from thermocouples, electrolytic cells, and the like, and more especially to means for eliminating from such measurement and from the servo circuits the effects of spurious and parasitic potentials due to leakage or to inductive or capacitive coupling between juxtaposed components of the system. The shielding of transformers and their individual windings in order to minimize electrostatic effects is well known in the art of electrical communication, and to a lesser degree in the field of electrical measurement. In the prior art it has been essential for effective performance that such shields as are provided be connected to "ground" the latter term being used in agreement with ASA Definition 35.15.005 as being ". . . earth, or some conducting body which serves in place of earth."

In those instances where it is practicable to maintain at substantially ground potential the source of electromotive force to be measured, the shielding method of the prior art has been found to be generally satisfactory; but from modern practices in measurement there have evolved many cases where for dominating reasons the sources whose electromotive forces are to be measured may not be grounded, and may in fact differ from ground potential by several hundred volts. In such installations, the conventional grounded shield is ineffective, and, while otherwise desirable for the operation of transformers in the servo system, may serve to accentuate, rather than to minimize, the influences of electrostatic coupling or conductive leakage.

It is an object of the present invention to provide means whereby a delicate system for the detection of small electromotive forces and their application to the control of servo-mechanisms and the like may be rendered insensitive to the influences of relatively high potentials existing between the sources of said potentials and the circuits or structure of the servo system.

In carrying out the purposes of the invention, it is proposed to combine with the input transformer which normally forms an essential component of devices of the nature under consideration a dual shielding system having one shielding component maintained at substantially ground potential and a juxtaposed shielding component maintained at substantially the potential of the source of electromotive force under measurement.

It is furthermore proposed to utilize the inherent characteristics of a type of synchronous contactor particularly adapted to use with the class of measuring circuit to which the invention is especially adaptable, whereby to eliminate from the control circuit the deleterious effects of such residual spurious potentials as may not be wholly eliminated by the shielding system.

In the single figure of the drawings, the invention is shown in its application to a self-balancing potentiometric measuring system comprising a D.-C. bridge network generally indicated by the numeral 10, a bridge-balancing motor 11, a synchronous reversing switch 12, an input transformer 13 and an amplifier 14, interconnected as presently to be set forth.

The bridge network 10 may be described as follows: A slide-wire 16 adapted for energization from a constant potential battery or equivalent source 17 in series with an adjustable current-standardizing rheostat 18, is provided with a movable contact 19 adapted to cooperate with said slide-wire in selecting therealong a point of potential suitable to balancing the associated network. In parallel with the slide-wire 16 is a resistor 20 having a tapped point 21 providing one terminal to which is made connection from a source of electromotive force whose magnitude is to be measured. Said source of electromotive force may be represented by a thermocouple 24 having extension leads 25 and 26, of which the former is connected to the terminal point 21 and the latter, through the reversing switch 12 in a manner hereinafter to be explained, to the movable contact 19.

The synchronous reversing switch 12 is preferably of the form fully set forth and described in U. S. Letters Patent No. 2,636,094 granted to J. L. Russell April 21, 1953, and comprises two sets of stationary contacts adapted to be alternatively engaged by a pair of movable contacts operated in synchronism with a source of alternating electromotive force. Insulatedly supported on a conducting base member 30 are a pair of stationary contacts 31 and 32 adapted for alternative engagement by a contact 33 movable therebetween. Similarly, a pair of stationary contacts 34 and 35 are adapted for alternative engagement by a movable contact 36. Contacts 33 and 36 are adapted for actuation by a ferromagnetic armature 37 in the field of an exciting winding 38 so as to partake of an oscillating motion in synchronism with alternating current in said winding, whereby, in cooperation with said stationary contacts to function as a pair of single-pole double-throw switches. The arrangement of the contacts is such that stationary contacts 32 and 34 are electrically engaged by their respectively associated movable contacts 33 and 36 at the same time intervals, while stationary contacts 31 and 35 are simultaneously engaged by said respective movable contacts in time intervals alternating therewith. Contacts 31 and 34 are both connected to the conductor 26 and contacts 32 and 35 to a conductor 39, which, in turn, is connected to the movable contact 19 of the measuring network. Thus, it will be seen with the armature 37 operating in synchronism with alternating current in the winding 38, the contact system will function as a commutating switch, periodically, and with reversing polarity, impressing upon the contacts 33—36 such electromotive force as may exist between the conductors 26 and 39.

The motor 11 is a conventional two-phase induction motor, being provided with a rotor 41 having mechanical connecting means 42 to the movable contact 19, whereby to position the latter with respect to the slide-wire 16. Said motor is provided with two mutually displaced windings 45 and 46, of which the former is adapted for energization from a constant-frequency alternating-current source 47, and the latter is connected to the output terminals of the amplifier 14. The winding 45 may have connected in circuit therewith a capacitor 48 or other phase-shifting device, whereby, according to principles well known in the art, to obtain optimum performance of the motor. Alternatively, the desired phase-shift characteristic may be introduced by suitable components incorporated in the circuits of the amplifier 14. The winding 38 of the synchronous contactor 12 is connected to the source 47, whereby operation of the contacting elements as hereinbefore set forth will be made synchronous with the excitation of the winding 45 in the motor 11.

The amplifier 14 may be of any one of several forms known to the art, and adapted to provide an alternating output current suitable to operation of the motor 11 and representative in magnitude and phase position of an alternating input potential of relatively small magnitude. A preferred form of amplifier suited to the purposes of the apparatus is that fully set forth and described in co-pending application Serial No. 305,607, filed by F. L. Maltby, August 21, 1952.

The purpose of the transformer 13 is to convert the substantially rectangular-wave output of the reversing switch 12 to a form and voltage suited to effective operation of the amplifier 14. The specification of such a transformer is subject to a wide latitude of choice, according to conditions in the measuring circuit and in the motor circuit, but as an example, suited to the purposes of the invention, the following may be cited: A primary winding 51 of 260 turns and a secondary winding 52 of 10,400 turns are linked with a common magnetic circuit 53, providing a step-up transformer with a turn ratio of 1/40. The primary impedance at normal operating frequency (60 cycles) may be made of the order of 500 ohms. The primary winding is connected by means of a pair of conductors 54 to the movable contacts 33 and 36 of the commutating switch 12, and the secondary winding is directly coupled to the input terminals of the amplifier 14.

The combination as thus far described comprises a self-balancing potentiometer adapted to position the contact 19 along the slide-wire 16 in accordance with the temperature to which the thermocouple 24 is exposed; and, since such performance is well known to those versed in the art, the operation of the apparatus need not here be further described.

It has been found that in applications of highly sensitive electrical measuring apparatus of the class described to the measurement of small voltages where the source of measured electromotive force can not be maintained at, or near, ground potential, special precautions must be observed in order to minimize, and preferably to eliminate, the influences of electrostatic coupling between different parts of the circuit or network. If, for example, some dominating condition requires that the thermocouple, or other source, must be maintained at an alternating potential other than ground, there become evident the effects of leakage from the transformer primary to ground, as well as of electrostatic coupling between the primary and ground or between the primary and secondary windings of the transformer. The lower the measurement range of the instrument in relation to the possible potential of the measuring circuit to ground, the more disturbing these effects.

The first step in minimizing the effects of electrostatic coupling between the measuring network and earth lies in providing a grounded shield for the transformer windings. This is accomplished by surrounding the primary winding with a conducting shield 55 and the secondary winding with a conducting shield 56, and connecting these shields, as well as the magnetic structure 53, to a grounded conductor 57, as shown. While this expedient (for which per se, no novelty is herein claimed) has been found helpful in so far as concerns certain sources of leakage and electrostatic coupling, it is ineffective in the important case under consideration, wherein a point on the measuring circuit may attain with respect to other parts of the apparatus an electrical potential having a magnitude many times that of the electromotive force under measurement.

It has been found that effective elimination of undesirable potential differences between critical points of the electrical circuits may be accomplished by providing the primary winding of the transformer 13 with an inner shield 58, totally enclosing said winding, electrically isolated from the outer shield 55, and connected to a point on the measuring network, as, for example, the conductor 39 which joins the movable contact 19 to the contact system of the synchronous commutating switch 12. In order to extend the shielding so provided to the interconnecting leads in the circuit, the conductors 54 leading from the commutating switch to the transformer primary are enclosed in a cable 60 having an outer and an inner shield, mutually insulated. The outer shield of the cable 60 is connected to the grounded conductor 57, and the inner shield is connected to the conductor 39. It is desirable, also, that the framework and mechanical parts of the commutating switch 12 be isolated from ground and connected, as by a jumper 61, to the conductor 39.

With shielding components and connections as set forth, it will be seen that no part of the measuring circuit is exposed to coupling or leakage to circuit components differing appreciably therefrom in electrical potential, and that such electrostatic stresses as may appear in the system are concentrated in locations where leakage or induction will have no effect on currents or electromotive forces existing in the measuring network.

It will furthermore be apparent that, instead of being inductively admitted to the transformer system, any alternating potential appearing between the inner shield 58 and other parts of the circuit, will be directly impressed through the conductor 39 upon the input side of the synchronous reversing switch 12. As set forth in previously mentioned Russell Patent No. 2,636,094, and as more fully explained in co-pending application Serial No. 77,484, filed February 21, 1949, by F. L. Maltby and J. B. Kelley, now Patent No. 2,677,095, April 27, 1954, the effects upon the inverted output potential of alternating components in the applied potential in this type of contactor are reduced to a magnitude negligible in comparison with those of the unidirectional component in the network. Thus, by not only minimizing the intensity of objectionable alternating potentials, but by rendering innocuous such components thereof as are residual in the circuit, the shielding provided by the present invention becomes doubly effective in preventing malfunctioning of the control.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. In combination, measuring apparatus having an electric circuit adapted for direct connection to a source of electromotive force to be measured and to produce a cyclically varying voltage having a magnitude representative of said electromotive force, electrically operated means to produce an effect representative of said voltage, a transformer adapted for operatively coupling said measuring apparatus with said electrically operated means and having a primary winding and a secondary winding, conductive shielding means enclosing both said windings and maintained at substantially ground potential, further shielding means electrically isolated from said first-named shielding means and interposed between the same and said primary winding, and a conductor connecting said last-named shielding means to a point on said electric circuit.

2. In combination, measuring apparatus having an electric circuit adapted for direct connection to a source of electromotive force to be measured and to produce a cyclically varying voltage having a magnitude representative of said electromotive force, said source being at a potential substantially different than ground potential, electrically operated means to produce an effect representative of said voltage, a transformer adapted for operatively coupling said measuring apparatus with said electrically operated means and having a primary winding and a secondary winding, conductive shielding means enclosing both said windings and maintained at substantially ground potential, further shielding means electrically isolated from said first-named shielding means and interposed between the same and said primary winding, and a conductor connecting said last-named shielding means to a point on said electric circuit to maintain said last-named shielding means at a potential substantially equal to that of said source.

3. In combination, measuring apparatus having an electric circuit adapted for direct connection to a source of electromotive force to be measured and to produce a cyclically varying voltage having a magnitude representative of said electromotive force, electrically operated means to produce an effect representative of said voltage, a transformer adapted for operatively coupling said measuring apparatus with said electrically operated means and having a primary winding and a secondary winding, cable means intercoupling said measuring apparatus and said primary winding and having mutually insulated outer shielding and inner shielding, conductive shielding means enclosing both said windings and maintained at substantially ground potential, further shielding means isolated from said first-named shielding means and interposed between the same and said primary winding, a first conductor connecting said last-named shielding means to a point on said electric circuit, a second conductor connecting said inner cable shielding and said further shielding means, and a third conductor connecting said outer cable shielding and said first-mentioned conductive shielding means.

4. In an electrical circuit arrangement comprising measuring apparatus having an electric circuit adapted for direct connection to a source of electromotive force to be measured and to produce a cyclically varying voltage having a magnitude representative of said electromotive force and electrically operated means to produce an effective representation of said voltage, a transformer adapted for operatively coupling said measuring apparatus with said electrically operated means comprising a primary winding, a secondary winding, a first conductive shielding enclosing said primary winding, a second conductive shield enclosing said secondary winding, means for maintaining said first and second conductive shields at substantially ground potential, a third conductive shield electrically insulated from said first conductive shield and interposed between the same and said primary winding, and means for maintaining said third conductive shield at a potential substantially equal to that of said source comprising a conductor interconnecting said third conductive shield and a point on said electric circuit.

5. In combination, an electrical measuring network adapted for direct connection to a source of unidirectional electromotive force to be measured, a circuit-controlling device having input terminals for connection to said network and having output terminals and adapted to produce at the latter a cyclically varying voltage representative of the electromotive force impressed upon its input terminals, electrically operated means to produce an effect representative of said voltage, a transformer for operatively coupling said output terminals with said electrically operated means and conductive shielding means enclosing a winding of said transformer and electrically connected to an input terminal of said circuit-controlling device.

6. In combination, an electrical measuring network adapted for direct connection to a source of unidirectional electromotive force to be measured, a circuit-controlling device having input terminals for connection to said network and having output terminals and adapted to produce at the latter a cyclically varying voltage representative of the electromotive force impressed upon its input terminals, electrically operated means to produce an effect representative of said voltage, a transformer for operatively coupling said output terminals with said electrically operated means and having a primary winding and a secondary winding, conductive shielding means enclosing at least one of said windings and electrically connected to an input terminal of said circuit controlling device.

7. In combination, an electrical measuring network adapted for direct connection to a source of unidirectional electromotive force to be measured, a circuit-controlling device having input terminals for connection to said network and having output terminals and adapted to produce at the latter a cyclically varying voltage representative of the electromotive force impressed upon its input terminals, electrically operated means to produce an effect representative of said voltage, a transformer for operatively coupling said output terminals with said electrically operated means and having a primary winding and a secondary winding, conductive shielding means enclosing said primary winding and electrically connected to an input terminal of said circuit controlling device.

8. In combination, an electrical measuring network adapted for direct connection to a source of unidirectional electromotive force to be measured, a circuit controlling device having input terminals for connection to said network and having output terminals and adapted to produce at the latter a cyclically varying voltage representative of the electromotive force impressed upon its input terminals, electrically operated means to produce an effect representative of said voltage, a transformer for operatively coupling said output terminals with said electrically operated means and having a primary winding and a secondary winding, conductive shielding means enclosing both said windings and maintained at substantially ground potential, further shielding means electrically isolated from said first-named shielding means and interposed between the same and said primary winding, and a conductor connecting said last-named shielding means to an input terminal of said circuit-controlling device.

References Cited in the file of this patent

UNITED STATES PATENTS

| | | |
|---|---|---|
| 1,907,400 | Davis | May 2, 1933 |
| 2,170,048 | Dunning et al. | Aug. 22, 1939 |
| 2,559,515 | Pourciau | July 3, 1951 |
| 2,614,188 | Williams et al. | Oct. 14, 1952 |
| 2,648,037 | Harrison | Aug. 4, 1953 |
| 2,677,095 | Maltby et al. | Apr. 27, 1954 |

OTHER REFERENCES

Publication: "Electronics," February 1945, p. 125.